June 1, 1971  O. J. BENNETT  3,581,314
LIFT STEM FOR FLOAT VALVE OF A WATER CLOSET TANK
Filed April 14, 1969
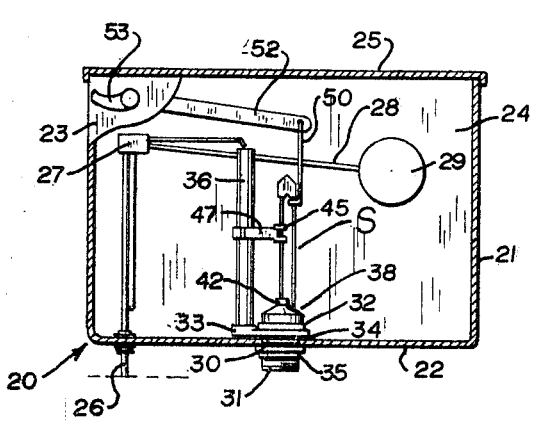
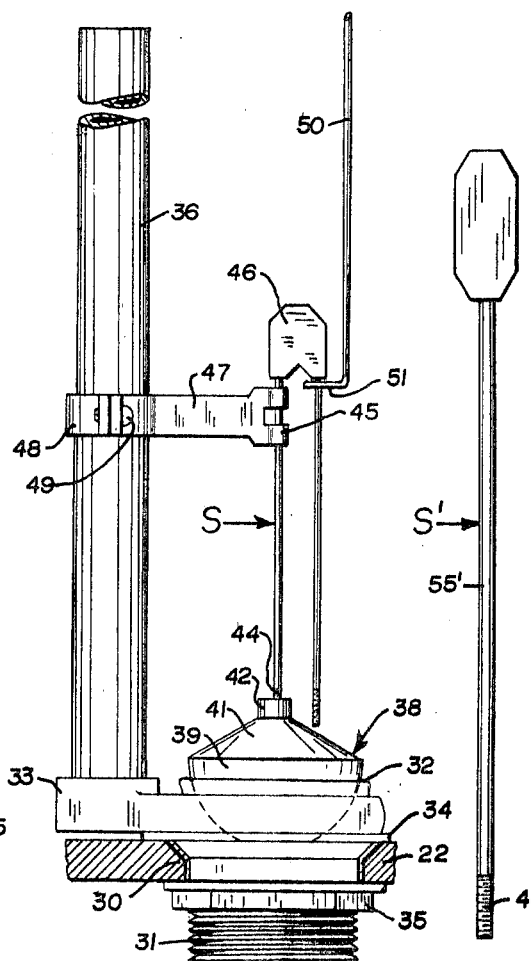
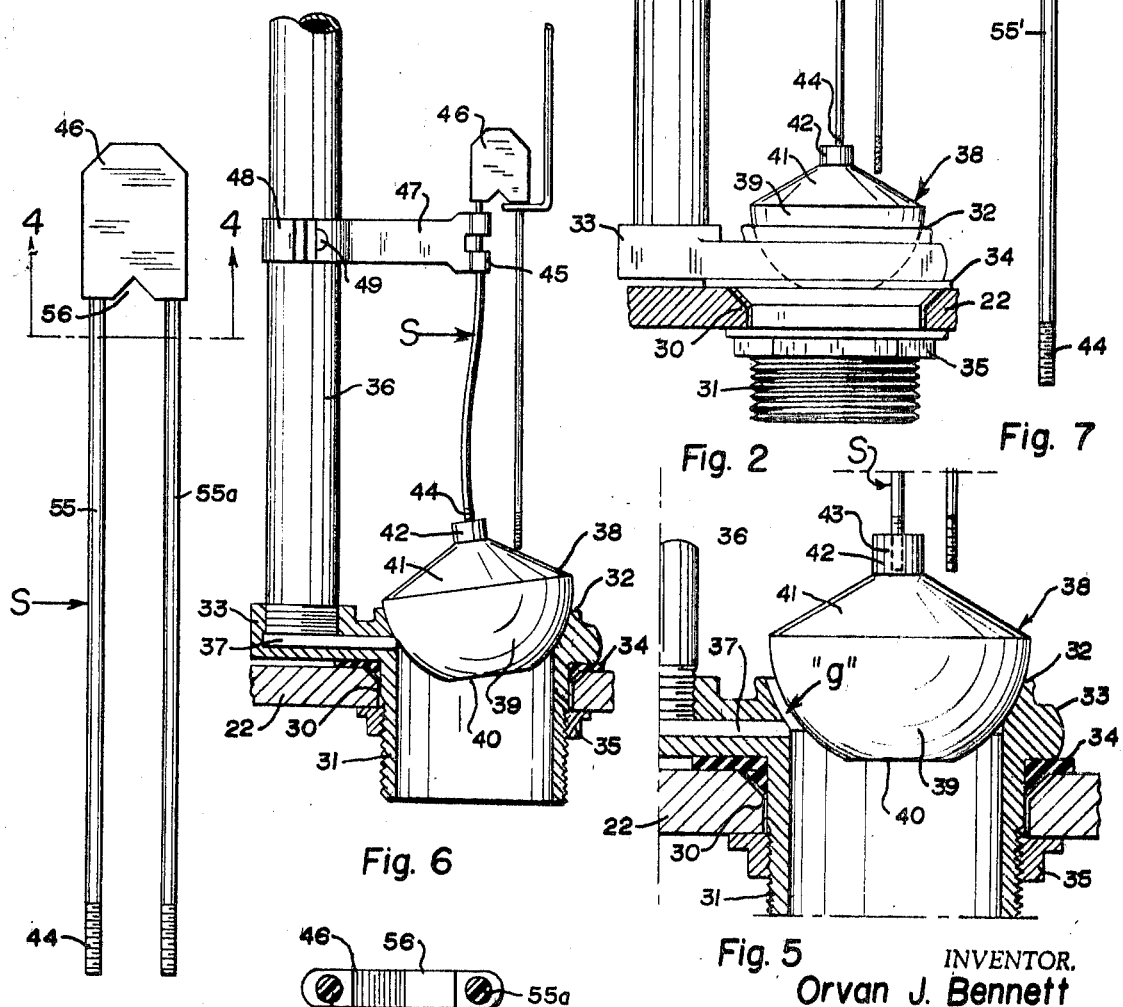
INVENTOR.
Orvan J. Bennett
BY
Van Valkenburgh E. Lowe
ATTORNEYS

United States Patent Office 3,581,314
Patented June 1, 1971

3,581,314
LIFT STEM FOR FLOAT VALVE OF A WATER CLOSET TANK
Orvan J. Bennett, Fort Lupton, Colo., assignor to Orvan J. Bennett, Fort Lupton, Jack E. Bennett, Denver, and Aldena A. Bashor, Longmont, Colo.
Filed Apr. 14, 1969, Ser. No. 815,719
Int. Cl. E03d 1/34
U.S. Cl. 4—56                                    5 Claims

ABSTRACT OF THE DISCLOSURE

In the float valve assembly for a standard water closet tank, a lift stem characterized by adequate flexibility to permit the float valve of the water closet tank to rotate upon the outlet seat at the base of the tank whenever the float valve contacts the seat in an offset position.

---

The present invention relates to water closet tanks and more particularly to the float valve structure in a water closet tank.

The primary object of the invention is to provide an improved float valve structure for a water closet tank which will not have any features significantly different from the present construction of float valves, but will improve the float valve action to provide trouble free and maintenance free operation for long periods of time.

The most common float valve structure for a water closet tank has not significantly changed since the turn of the century, although over the years many improvements have been proposed as evidenced by a large number of patents in this art. This common, well known float valve is a hollow, rubber member having a hemispherical undersurface which seats upon a circular outlet at the base of the water closet. The top of this member is conical having a boss at its center. A metal lift stem upstands from this boss to extend upwardly and through a guide sleeve above the outlet. This guide sleeve is usually secured to a standpipe adjacent to the outlet of the water closet. A lifting mechanism is provided above the guide sleeve to slidably connect with the lift stem to lift the float valve from the outlet so that it will move upwardly against the guide sleeve and remain there until the water in the tank drains below the guide sleeve. Then the float valve will float above the outlet and as the tank empties, the valve will drop upon the outlet seat to again close the tank.

When new and in good condition, this conventional float valve structure works perfectly to lift, permit the tank to drain and then drop back to the seat to close the tank to permit it to refill. In the ordinary case, the float structure will continue to work without any problems for a time. However, eventually some sort of trouble will occur to cause the valve to malfunction. It may be through wearing or the corrosion of the metal lift stem in the float valve causing it to break or to cut into the guide and stick. The trouble may be otherwise, such as caused by hard water deposits forming crusts on the guide and on the stem, resulting in sticking or improper seating. A more serious problem relates to leakage past the float valve when it is seated upon the outlet in a slightly offset position. Either because of a slight misalignment when the float valve is new, or because of misalignment or sloppy fitting, through wear, the float valve often seats upon the outlet in a slightly offset position. When new, the water pressure on the valve will usually cause it to slip to a seated, fully closed position, but after a period of use, the valve may commence to stick in an offset position and a small continual leak will result.

Heretofore, there has been an extensive development to provide guides generally in the form of a sleeve about the float valve such as that disclosed in the patent to David, No. 2,135,231 or in my patent, No. 3,378,856, to eliminate this undesirable sticking when the float valves have been in use for several years. Certain of these devices heretofore developed are effective and do provide more reliable operation of the valve over an extended time period. However, none have met with any significant commercial success; apparently not because of the small additional cost over the cost of the conventional float valve structure, but because of the reluctance of the general public to change from a structure they have accepted for a long time to a different type of structure.

Nevertheless, a very definite need exists for improvements in the several components of a water closet tank valve structure to render the valve structure trouble free over a longer period of time than now possible. Ordinarily, when the valve of a water closet tank commences to stick and leak, the owner thereof will usually purchase a new stem and perhaps a new float valve at a local store and replace the worn members in the tank thus providing trouble free operations for another year or so. With such a practice well established by the public, it is essential that any improvement, which will substantially extend the trouble free life of a water closet tank, must not substantially deviate, in appearance at least, from the items that are now being purchased by the general public for this purpose.

The present invention was conceived and developed with the foregoing considerations in view and comprises, in essence, in the combination with a conventional valve structure of a water closet tank, an improved lift stem which is constructed of a moderately rigid, but nevertheless flexible, plastic material having a quality of stiffness which is sufficient to restrain the float vale when it is at a position above the outlet, but at the same time, having sufficient flexibility as to permit the float valve to shift, yield and assume a fully seated position upon the outlet whenever the outlet is closed even though the valve is seated upon the outlet in an offset manner.

It follows that another object of the invention is to provide in a float valve structure, an improved lift stem which is sufficiently flexible as to permit the float valve to rotate upon its seat to effect a leakproof closure, but at the same time is sufficiently rigid to restrain the float valve from lateral movements away from a properly aligned position above the outlet when the outlet is open.

Another object of the invention is to provide a novel and improved lift stem for the float valve of a water closet tank which will not increase the cost of the same over that of a conventional stem.

Another object of the invention is to provide a novel and improved lift stem for the float valve structure which will not cause wear on the guides, nor corrode nor retain crusts from hard water deposits and accordingly, will not stick after it has been in use for a period of time.

Another object of the invention is to provide a novel and improved lift stem construction for a float valve which may be manufactured out of tough, durable materials for an exceedingly low unit cost.

A further object of the invention is to provide an improved lift stem for the valve of a water closet tank which may be manufactured as a dual type providing two interchangeable stems in one unit.

Other objects of the invention are to provide a novel and improved lift stem for the valve structure of a water closet tank which is a low cost, rugged and durable unit and which can be installed by an individual without the need for a plumber or the like.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is a front elevation view of a water closet tank, with a substantial portion of the front wall of the tank being removed to show the interior thereof and with one embodiment of the improved float valve lift stem being used therein.

FIG. 2 is a fragmentary portion of the showing at FIG. 1, but on a greatly enlarged scale to better depict the float valve assembly.

FIG. 3 is an elevation view of the improved lift stem structure per se shown in FIG. 2, but on a further enlarged scale.

FIG. 4 is a fragmentary sectional detail as taken from the indicated line 4—4 at FIG. 3, but on an enlarged scale.

FIG. 5 is an enlarged, fragmentary, sectional detail of a portion of the float valve structure shown at FIG. 2, but with the valve being improperly seated upon the outlet and showing in a somewhat exaggerated manner an opening at one edge of the seat where leakage will occur.

FIG. 6 is a sectional detail similar to the showing at FIGS. 2 and 5, but illustrating the manner in which the improved lift stem flexes to permit the valve to rotate to a fully seated, non-leaking position.

FIG. 7 is an elevation view similar to FIG. 3, but illustrating a modified form of the lift stem, wherein only a single stem structure is provided.

Referring more particularly to the drawing, the conventional water closet tank 20, wherein the float valve structure is mounted, is an enclosed, box-like unit having comparatively narrow sidewalls 21, a bottom 22, a front wall 23, a rear wall 24 and lid 25. This tank is ordinarily mounted upon a wall behind the water closet or upon a shelf at the rear of the water closet itself and in any conventional manner not shown.

An inlet line 26 extends upwardly from the bottom 22 at one side of the tank to upstand within the tank and a shutoff valve 27 is located at the top of this inlet line. The shutoff valve is operated by an arm 28 having a float 29 at its outer end. Whenever the tank is filled with water to a selected level, the float lifts the arm to close the valve, but whenever the water is below this level, the float drops to open the valve.

The float valve structure is located at an opening 30 at the center of the tank bottom and includes a short, comparatively large diameter pipe 31 which is mounted within the opening 30. The lower end of this pipe may be connected with another pipe leading to the water closet or may be connected directly to the water closet itself in any suitable manner not shown. This discharge pipe 31 is commonly provided as a preassembled structure mounted in the outlet 30. The top of the tubular pipe 31 is formed as an entrance seat 32 a short distance above the bottom of the tank and this entrance seat is adapted to receive the float valve hereinafter described. A flange 33 girdles the pipe 31 a short distance below this seat and it is adapted to rest upon a rubber gasket 34 which, in turn, rests upon the bottom of the tank about the opening 30. The lower portion of the pipe 31, underneath the tank, is externally threaded to receive a lock nut 35 which may be turned against the underside of the tank to secure the outlet pipe 31 in position. The flange 33 near the top of the outlet structure, includes an offset portion which supports a standpipe vent 36 with the passageway through the standpipe communicating with the passageway in the outlet pipe through a slotted opening 37 in the offset portion of the flange.

The float valve 38, of a conventional type, is in the form of a hollow member of rubber or like material having a hemispherical undersurface 39 with a hole 40 at the bottom. A conical top 41 terminates as a central, upstanding boss 42, at the apex, which has an internally threaded hole along the vertical axis of the float valve as indicated in broken lines at 43 at FIG. 5. The improved lift stem S, which is hereinafter further described, is threaded at its bottom end, as at 44, to be fitted into the hole 43 in the boss 42 to upstand from the float valve 38 and extend upwardly into the tank.

The upper end of this lift stem S extends through the passageway of a guide 45 to terminate thereabove as a head 46. The guide 45 is carried upon an arm 47 which may be secured to any rigid member within the tank and is preferably, cantilevered from the standpipe 36 and held thereon as with a lock clamp 48 and bolts 49.

This general organization is completed by a lift rod 50 having an offset eye 51 at its base which slidably engages the lift stem S as will be described. The upper end of the lift rod connects with a lift arm 52 at the top of the tank which is mounted for rotation upon a shaft, not shown, at the front wall 23 of the tank and is lifted by a hand lever 53.

In normal, conventional operation, whenever the tank is full of water, the hand lever 53 may be depressed to lift the arm 52, so that the lift rod 50 will engage the head 46 of the lift stem S to thereby lift the float valve 38 from its outlet seat 32. The float valve will then move upwardly to the point where the boss 42 is against the underside of the guide 45 to remain in this lifted position until the tank is emptied below the level of the guide 45. Thereafter, the float drops as the water level in the tank continues to drop responsive to discharge through the outlet. When the tank is almost empty, the suction effect of flow into the outlet pulls the float valve onto the entrance seat to close the tank.

In the construction illustrated at FIGS. 1 through 6, the lift stem S is a double unit, having two cylindrical, smooth-walled rods 55 and 55a connected to a common head 46. The rods extend from this head in spaced parallelism. Each rod, 55 and 55a, is threaded at its lower end, as at 44, so that either rod may be fitted into the threaded hole 43 of the float valve boss. Thus, one rod 55 will be used as the primary stem member and the other rod 55a will become a complementary stem member which can be used interchangeably with the primary member. Accordingly, the lift stem S may be formed as a symmetrical unit with the head 46 being a flattened member having a thickness sufficient to rest upon the lift rod eye 51. A notch 56 is formed in the head portion between the rods to provide for clearance between the two rods and to facilitate separating the double unit lift stem if desired.

In assembly of this lift stem S to the outlet valve, the lift rod eye 51 is preferably fitted upon the complementary rod 55a as illustrated. This arrangement is advantageous in the assembly of the unit within the water tank because the lift rod 50 need not be connected to this complementary rod 55a until after the primary rod is fitted upon the guide 45 and connected to the float valve at the boss 42.

The lift stem S', shown at FIG. 7, is illustrative of a modified form of the invention using a single rod 55', threaded as at 44, to connect with a float valve boss and having a head 46' which seats upon the lift rod eye 51 when the unit is assembled in the outlet structure. This single lift stem 43', when installed in the water closet tank, will have the general appearance of a more nearly conventional unit.

The guide stem S and the modified type S', are made of a selected, tough, wear-resistant, synthetic thermoplastic resin having the general characteristics of plastics such as nylon, polypropylene, polycarbonate or polyurethane and which will be hereinafter referred to simply as a "Plastic." Such a selected plastic is preferably of a type which may be formed by injection molding. When injection molding is used, the completed article, the threaded rods 43 and 43a and the head 46, will be a unitary member.

The plastic lift stem S has three features which do not exist insofar as conventional, metallic lift stems are concerned. First, the improved lift stem is inert to chemical action of the water and will neither accumulate deposits nor corrode. Secondly, the improved lift stem is exceedingly wear and stick resistant and will move in the guide 45 through many tank filling and emptying cycles and over a period of time which is a substantial portion of the life of the tank without noticeable wear, either on the rod or on the guide 45.

The third advantage and the great utility in using a lift stem of a selected plastic material resides in the fact that it is substantially more flexible than metal rods heretofore used, but is nevertheless, rigid enough to hold the float in position when it is lifted above the outlet opening. The conventional lift stems of metal, brass or iron, are usually made from rods which will vary between 1/16-inch and 1/8-inch in diameter and it was found that the same proportions are suitable for a plastic stem 55 according to this invention.

While it is necessary for this stem to be sufficiently rigid to keep the float valve 38 in position above the outlet, it was found that if the stem were sufficiently flexible to permit the float valve to rotate slightly from its normal, vertical alignment, the problem of a leaking float valve would be solved in practically every instance. FIG. 5 illustrates the effect of seating the float valve in a slightly offset manner where the float valve 38 contacts only one side of the entrance seat 32 and sticks in this position as in the manner which has been observed to occur in water closet tanks in use for several years. A gap "g" appears at the opposite side of the point of contact of this valve, and although this gap is ordinarily quite narrow compared with the gap illustrated at FIG. 5, it can cause a very substantial loss of water by leakage through the water tank over a period of time in addition to the noise nuisance occurring because the tank filling valve 27 will never be completely closed.

In the situation outlined, where the gap "g" occurs, either the float valve must slip upon the entrance seat 32 to a centered, seated position, or rotate about an axis normal to the vertical axis of the stem 55 to close the opening. With the improved flexible stem S, this rotation is easily possible and the stem will flex to a configuration such as shown at FIG. 6 as soon as the tank commences to fill and exert a downward water pressure upon the float valve.

I have now described my invention in considerable detail. However, it is obvious that others skilled in the art can build and devise alternate and equivalent constructions which are nevertheless within the spirit and scope of my invention.

I claim:

1. A lift stem for the float valve of a water closet tank, of the type having: an outlet entrance seat at the floor thereof with a standpipe vent adjacent thereto; said float valve being adapted to normally rest upon the seat to close the tank and being formed as a hollow body having a hemispherical undersurface to seat upon the entrance seat and a boss at its top having a threaded socket therein adapted to receive the bottom of the lift stem; a tubular guide above the outlet carried upon an arm cantilevered from the standpipe adapted to slidably hold said lift stem upright and to restrain the stem and float valve whenever the float valve moves upwardly and laterally away from its outlet seat, to thus hold the valve over the seat; and lifting means above the guide to slidably connect with said lift stem to lift the valve from the outlet seat; and wherein said lift stem comprises:

a cylindrical, elongated rod having a threaded end adapted to be fitted into the aforesaid boss, and having a diameter slightly less than the diameter of the guide to slide therethrough, having a length sufficient to extend through the guide and a head at the opposite end adapted to connect with the aforesaid lift means, wherein:

said rod is of a synthetic resin material of a class which includes nylon, and is characterized by: being inert to the chemical action of water; resistant to the accumulation of deposits from water; having a slick, wear resistant surface; and, being moderately stiff and resiliently flexible, whereby the same may be proportioned to yield and shift in a vertical plane to permit the float valve to rotate when contacting an edge of the seat and to assume a fully seated position when the tank is filled with water.

2. In the organization set forth in claim 1, wherein said lift stem comprises:

a pair of cylindrical, elongated rods, each having one end threaded and each being interconnected at spaced apart positions at the head to normally lie in mutual spaced parallelism whereby one member thereof may be extended through the guide means to be connected with the float valve and the other member may be connected to the aforesaid lift means.

3. In the organization set forth in claim 1, wherein said lift stem is formed of a synthetic resin of a type suitable for forming by injection molding, and said rod and head are formed as a unitary structure.

4. In the organization set forth in claim 1, wherein said guide stem is nylon.

5. In the organization set forth in claim 4, wherein the passageway through the aforesaid guide is less than 1/8 inch in diameter and the diameter of the lift stem is in the range between approximately 1/8 inch and 1/16 inch.

References Cited

UNITED STATES PATENTS

| | | | |
|---|---|---|---|
| 1,924,381 | 8/1933 | Sachs | 4—56 |
| 2,135,231 | 11/1938 | David | 4—57 |
| 2,573,869 | 11/1951 | Offutt | 4—67X |
| 2,584,407 | 2/1952 | Wittka | 4—56 |
| 2,625,691 | 1/1953 | Clifton, Sr. | 4—57 |
| 2,778,028 | 1/1957 | Wemer | 4—57 |
| 3,041,630 | 7/1962 | Williams | 4—37 |
| 3,076,973 | 2/1963 | Lengyel et al. | 4—56 |
| 3,378,856 | 4/1968 | Bennett | 4—57 |

LAVERNE D. GEIGER, Primary Examiner

H. K. ARTIS, Assistant Examiner

U.S. Cl. X.R.

4—28